(12) United States Patent
Kitamura et al.

(10) Patent No.: US 6,438,089 B1
(45) Date of Patent: Aug. 20, 2002

(54) OPTICAL PICKUP DEVICE

(75) Inventors: Kazuya Kitamura; Yukio Kurata, both of Tenri; Tetsuo Iwaki, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/573,626

(22) Filed: May 17, 2000

(30) Foreign Application Priority Data

May 18, 1999 (JP) ............................................ 11-136640

(51) Int. Cl.⁷ ................................................. G11B 7/00
(52) U.S. Cl. ................................................. 369/112.23
(58) Field of Search ...................... 369/112.24, 112.23, 369/112.1, 44.23; 359/677, 717.719

(56) References Cited

FOREIGN PATENT DOCUMENTS

JP        10-123410        5/1998

*Primary Examiner*—William Korzuch
*Assistant Examiner*—Kimlien T. Le
(74) *Attorney, Agent, or Firm*—David G. Conlin; Peter J. Manus; Dike Bronstein Roberts & Cushman Intellectual Property Practice Group of Edwards & Angell, LLP

(57) ABSTRACT

In an optical pickup device, the numerical aperture (NA) of an objective lens is set at 0.7 or more, and the ellipticity of polarized light of a light beam which is incident upon the objective lens is set to be larger than (1.4×NA)−0.7. According to the structure, an optical pickup device which can prevent deterioration of the jitter and crosstalk characteristics, for example, due to oval deformation of a beam spot can be provided.

5 Claims, 6 Drawing Sheets

OPTICAL PICKUP DEVICE

BACKGROUND OF THE INVENTION

1. Field of the Invention

The present invention relates to an optical pickup device, which has an objective lens with a high NA, for recording and reproducing information onto and from an optical information recording medium.

2. Description of the Background Art

Since light-employing techniques enable a large number of features such as high speed processing due to high frequencies, spatial information processing and phase processing, they are subject to research and development and put to practical use in wide-ranging areas including communication, measurement and processing.

For the techniques, high-precision objective lenses are used to reduce optical beams.

In recent years, expectations for image recording devices, particularly those employing light have been high, and techniques for mass storage capacity have become important. In addition to the importance of improving a recording medium, it is essential for mass storage of optical information recording to provide a smaller radius of a beam spot, that is, to sufficiently narrow down a beam spot by using an objective lens.

As is well known, a beam spot radius is proportional to a light wavelength and inversely proportional to an objective lens NA (Numerical Aperture). For the wavelength, blue laser diodes or blue or green SHG lasers have been developed in recent years. For the higher NA of an objective lens, higher density has been achieved such that the NA is 0.6 for DVDs (Digital Versatile Disks) as compared with 0.45 for CDs (Compact Disks). However, attaining much higher NAs has been difficult from a manufacturing point of view by using a single lens with two aspheric surfaces. Therefore, an optical pickup device for attaining a higher NA by using two-group, two-element lens system is disclosed in Japanese Patent Laying-Open No. 10-123410.

FIG. 11 shows a 2-group 2-element objective lens disclosed in Japanese Patent Laying-Open No. 10-123410. An objective lens 101 is formed of a first lens 102 having two aspheric surfaces and a second lens 103 of a plano-convex lens having an aspheric shape for the convex surface, and the objective lens has an NA of 0.85. Light which passes through objective lens 101 enters a transparent body 104 and forms a beam spot at an image point 105.

However, in an optical pickup device having a high NA objective lens, the inventors found out that the shape of a beam spot becomes oval due to the polarized state of incident light, resulting in bad effects on jitter and crosstalk characteristics, for example.

SUMMARY OF THE INVENTION

In order to solve the above described problems, an object of the present invention is to provide an optical pickup device which can prevent deterioration of the jitter and crosstalk characteristics, for example, due to oval deformation of a beam spot.

An optical pickup device for attaining the above object according to the present invention collects a light beam from a light source by an objective lens and irradiates an optical recording medium. In the optical pickup device, the objective lens has a numerical aperture (NA) of 0.7 or more, and the ellipticity of polarized light of the light beam which is incident upon the objective lens is set to be larger than $(1.4 \times NA) - 0.7$.

By setting the numerical aperture of the objective lens and the ellipticity of polarized light of the light beam which is incident upon the objective lens to satisfy the above condition, it is possible to improve the jitter characteristic and reduce crosstalk.

In a preferred embodiment of the optical pickup device according to the present invention, the light beam which is incident upon the objective lens is elliptically polarized light, and the longer axis direction of the ellipse is almost parallel to the track width direction of the optical recording medium.

Thus, the beam spot radius in the track direction can be set as small as possible and, as a result, the bad effects on the jitter characteristic can be suppressed.

In the optical pickup device according to the present invention, the objective lens can be formed of two lenses arranged on an identical optical axis.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, the principle of the present invention will be described before illustrating an embodiment of the present invention.

Figure 1:
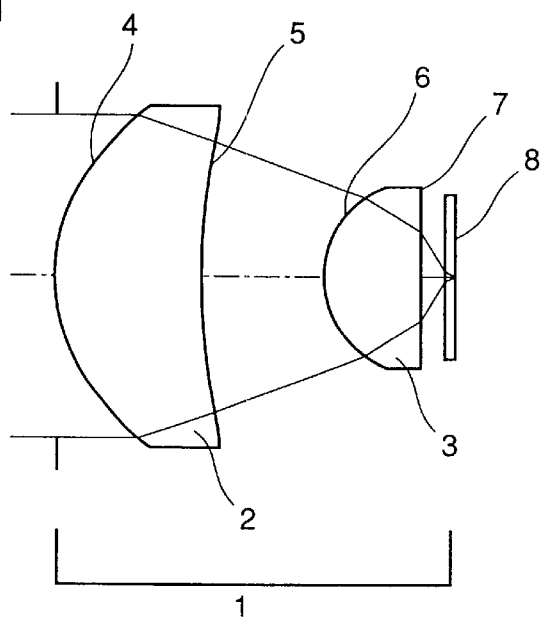
FIG. 1 shows an optical system for describing the principle of the present invention.

FIG. 1 shows an optical system for describing the principle of the present invention. In the optical system of FIG. 1, an objective lens 1 is formed of a first lens 2 and a second lens 3. Light incident upon objective lens 1 enters first lens 2 from a first surface 4 and exits it from a second surface 5. The incident light enters second lens 3 from a third surface 6 and exits it from a fourth surface 7. Thus, the incident light irradiates a right recording medium 8 as a beam of a high NA.

The inventors found out in an optical system (objective lens) which outputs such a beam of a high NA that the polarization characteristic of light which is incident upon the objective lens deforms the perimeter of a beam spot formed on an optical recording medium to an oval shape and, as a result, deteriorates the jitter characteristic and the like.

In the following, the reason why the beam spot perimeter becomes an oval will be described. Here, the description is based on a case where a linearly polarized light beam is incident upon objective lens 1.

Figure 2:
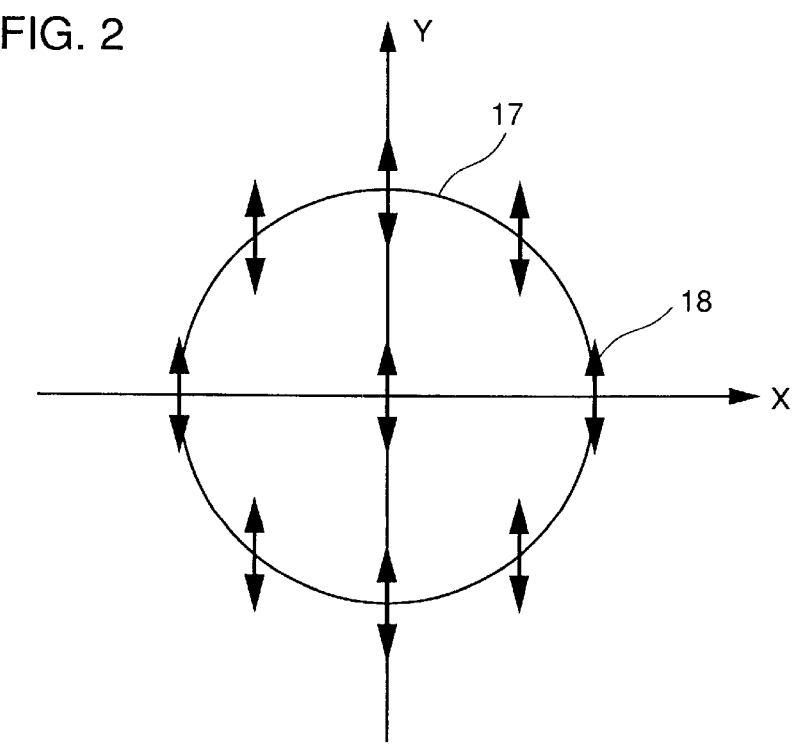
FIG. 2 illustrates relations between the entrance pupil of an objective lens and the polarization direction (direction of an electric field vector) of a light beam which is incident upon the objective lens.

FIG. 2 illustrates relations between the incident pupil 17 of objective lens 1 and the polarization direction (direction of an electric field vector) of a light beam which is incident upon the objective lens. It is noted in the figure that a plane perpendicular to the travel direction (z axis) of the light beam is an x-y plane and that the light beam is linearly polarized in the y-axis direction.

Figure 3:
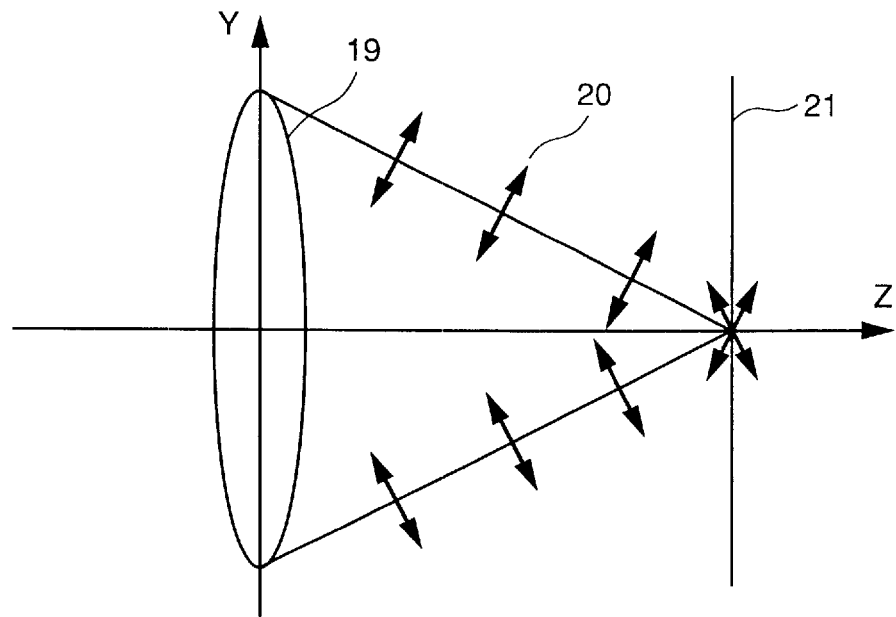
FIG. 3 illustrates, in a z-y plane, relations between the polarization direction of the light beam at an exit position from the objective lens and the exit pupil of the objective lens.
Figure 4:
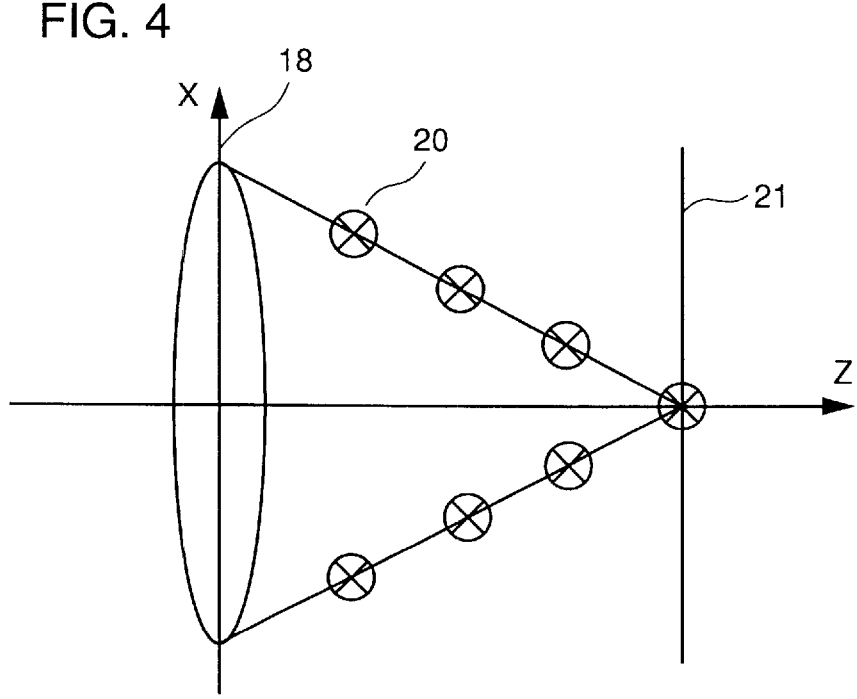
FIG. 4 illustrate, in a z-x plane, relations between the polarization direction of the light beam at the exit position from the objective lens and the exit pupil of the objective lens.
Figure 5:
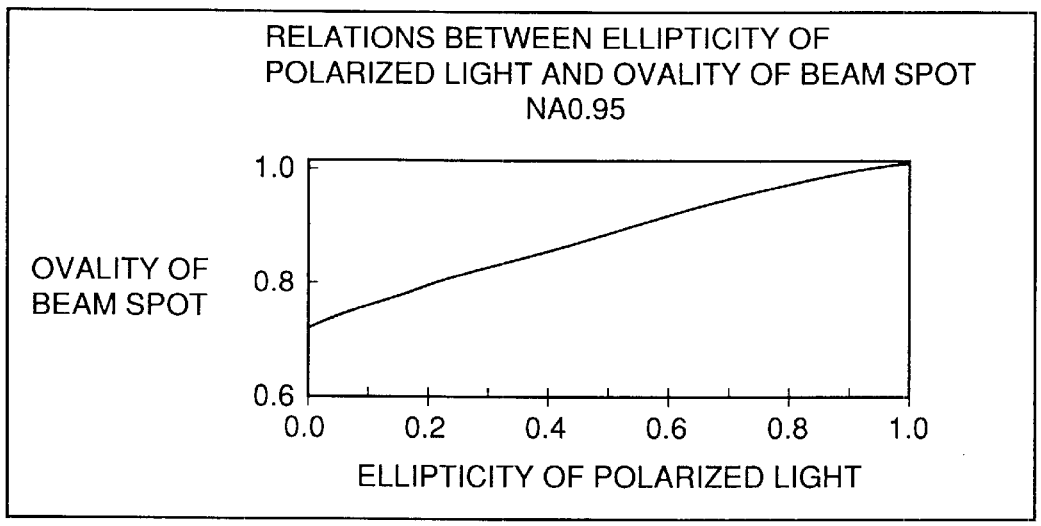
FIG. 5 illustrates relations between the ovality of a beam spot and the ellipticity of elliptically polarized light of a light beam which is incident upon an objective lens when NA is 0.95.
Figure 6:
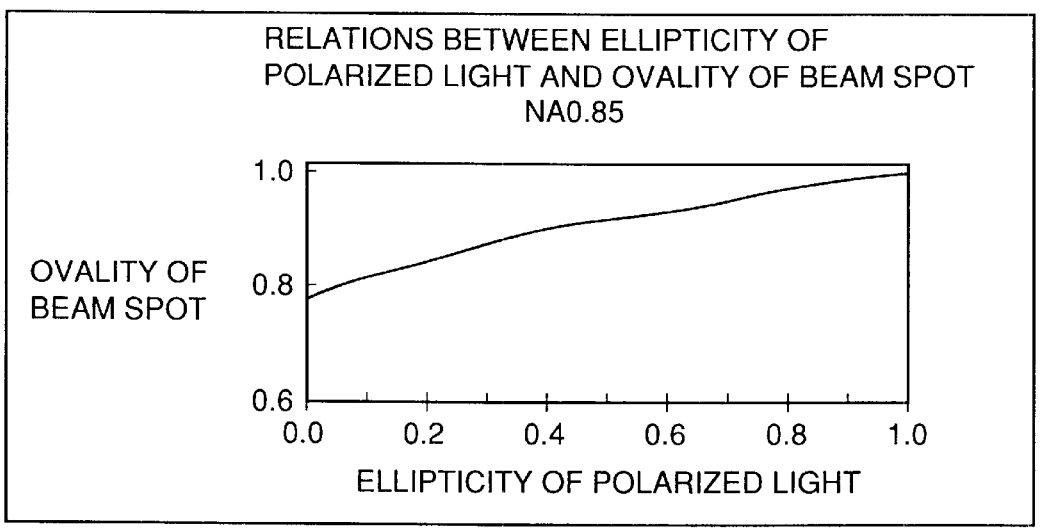
FIG. 6 illustrates relations between the ovality of a beam spot and the ellipticity of elliptically polarized light of a light beam which is incident upon an objective lens when NA is 0.85.
Figure 7:
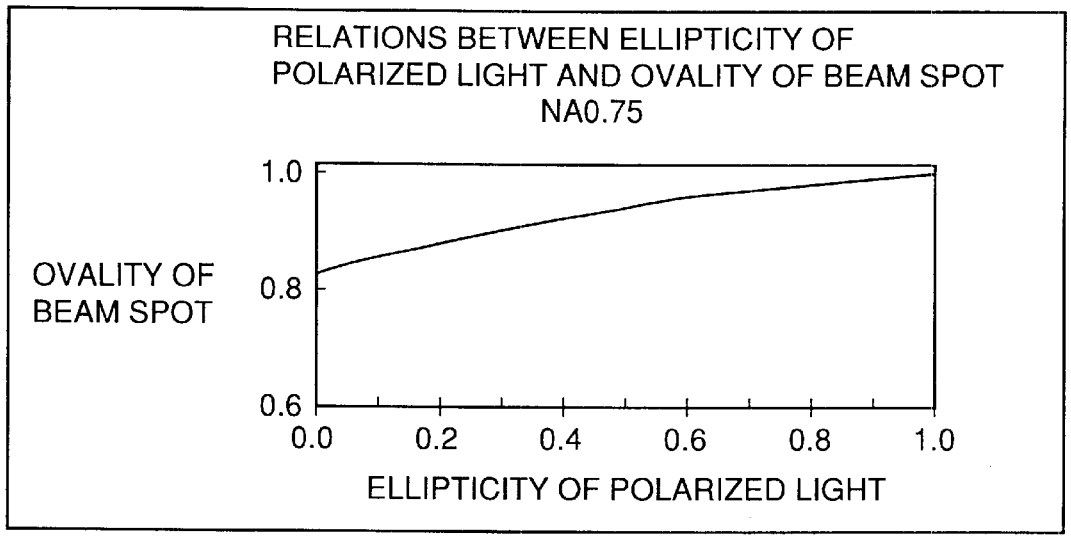
FIG. 7 illustrates relations between the ovality of a beam spot and the ellipticity of elliptically polarized light of a light beam which is incident upon an objective lens when NA is 0.75.

FIG. 3 illustrates, in a z-y plane, relations between the polarization direction 20 of the light beam shown in FIG. 2 at an exit position from objective lens 1 and the exit pupil 19 of objective lens 1. FIG. 4 illustrates, in a z-x plane, relations between the polarization direction 20 of the light beam at the exit position from objective lens 1 and the exit pupil 19 of objective lens 1. Here, 21 denotes an image formation plane (optical disk plane) in FIGS. 3 and 4.

As can be seen from FIGS. 3 and 4, polarization direction 20 of the light beam which comes out of exit pupil 19 is parallel to image formation plane 20 in the z-x plane (see FIG. 4) whereas polarization direction 20 tilts with respect to image formation plane 21 in the z-y plane (see FIG. 3). If polarization direction 20 tilts with respect to image formation plane 21 as described above, when the optical beam hits upon image formation plane 21, the projections of electric fields on image formation plane 21 interfere with each other, which influences a diffraction pattern. Thus, the beam spot cannot be made smaller.

Therefore, when a linearly polarized light beam is incident upon objective lens 1 as described above, the beam spot radius is increased in one direction. In other words, the beam spot assumes an oval shape.

This applies to elliptical polarization as well as linear polarization of incident light to objective lens 1. In other words, if the ellipse longer-axis direction of polarized light of a light beam which is incident upon an objective lens is parallel to the y-axis, the influence of the electric field interference on an image formation plane is greater in the y-axis than the x-axis, and the beam spot radius in the y-axis direction becomes larger than the beam spot radius in the x-axis direction. In the following, the case of elliptical polarization will be described in detail.

FIGS. 5 to 8 illustrate relations between the ovality (shorter radius/longer radius) which is a ratio of the longer rading to the shorter radius of a beam spot on an optical recording medium plane and the ellipticity of elliptically polarized light of a light beam which is incident upon an objective lens when the NA of the objective lens is 0.95, 0.85, 0.75 and 0.65. Here, the ellipticity is $(a/b)^2$ (=(ellipse shorter axis/ellipse longer axis)$^2$) in which an ellipticity of 0 means linear polarization and an ellipticity of 1.0 means circular polarization. Furthermore, the beam spot radius is a radius of a portion which has an intensity at least $1/e^2$ times the peak intensity of the light beam. Here, "e" is a base of natural logarithm (=2.718 . . . ).

As can be seen from the figures, the ovality value of a beam spot is smaller, that is, the oval degree of the beam spot is higher at a portion having a smaller ellipticity value of polarized light. At a portion having a larger ellipticity value, the ovality value of a beam spot is larger, that is, the oval degree of the beam spot is lower. As the NA of an objective lens increases, the ovality value of a beam spot is smaller, that is, the oval degree is higher. In other words, a larger incident angle for an image formation plane provides a higher oval degree. This is because the polarization direction comes to have a larger angle to the image formation plane (optical recording plane) as illustrated in FIGS. 2 to 4.

Figure 8:
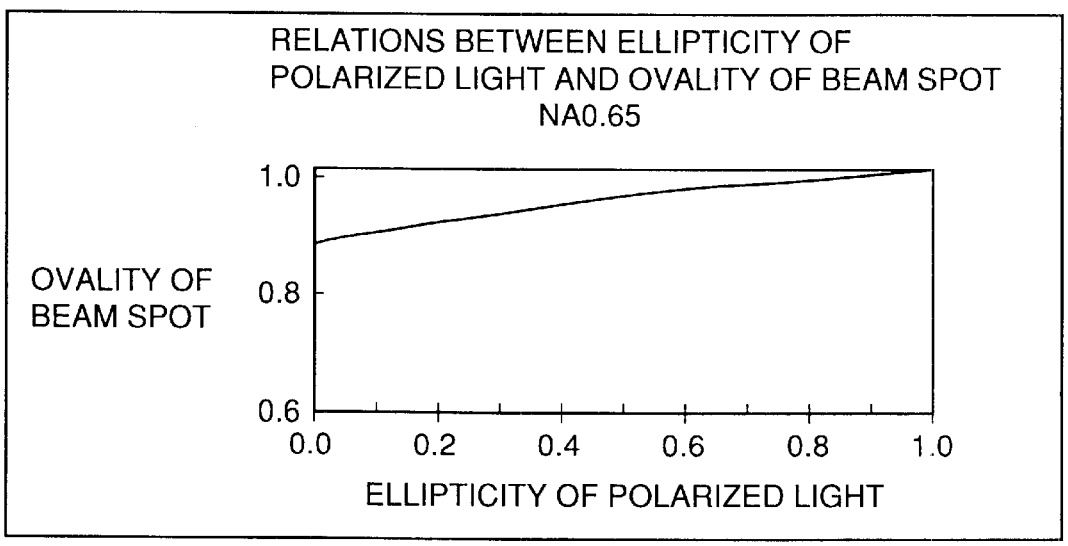
FIG. 8 illustrates relations between the ovality of a beam spot and the ellipticity of elliptically polarized light of a light beam which is incident upon an objective lens when NA is 0.65.
Figure 9:
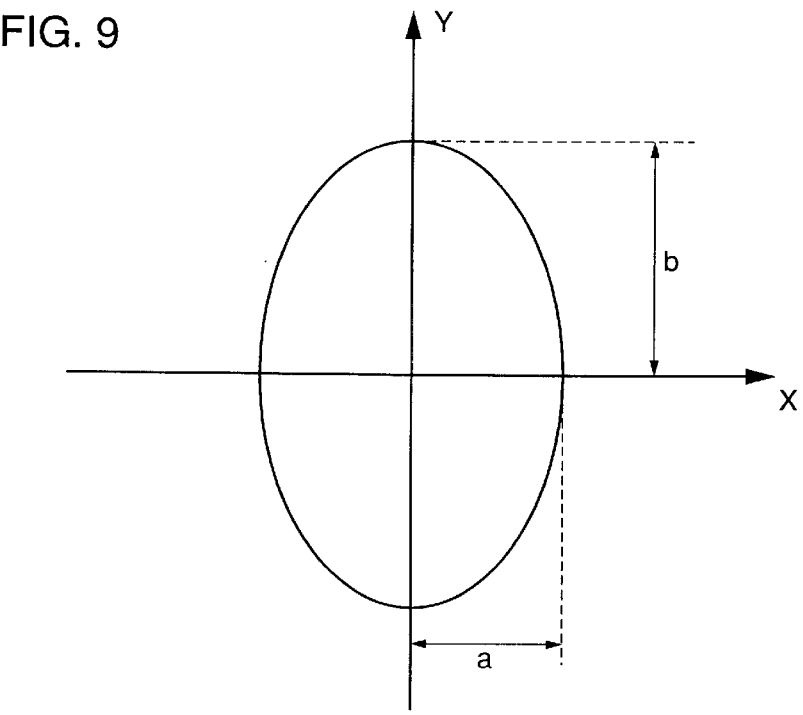
FIG. 9 is a view for describing the ellipticity.

Meanwhile, when the ovality value of a beam spot which irradiates an optical recording medium becomes smaller than 0.9, the jitter characteristic is subject to remarkable adverse influences when the longer radius direction of the beam spot is parallel to the track direction of the optical recording medium. When the longer radius direction of the beam spot is parallel to the track width direction, jitter and stroke are increased. Therefore, the ovality value of a beam spot is desirably larger than 0.9. Considering this point, it is understood that when the NA is 0.65 as shown in FIG. 8, the influences are not so great whereas when the NA is high as in FIGS. 5 to 7 (NA≧0.7 as examined by the inventors), the ovality value of a beam spot becomes smaller than 0.9 and the bad influences as described above may be suffered.

When the condition to set the ovality of a beam spot to 0.9 or more is examined based on FIGS. 5 to 8, the following is obtained.

$$\text{(the ellipticity of polarized light)} > (1 \cdot 4 \times NA) - 0.7 \quad (1)$$

If the condition is satisfied, it is possible to improve the jitter characteristic and to reduce crosstalk. Although the condition of expression (1) is found based on FIGS. 5 to 8 as described above, the ovality of a beam spot is determined by an angle between the polarization direction and the image formation plane, that is, an NA as described with respect to FIGS. 2 to 4. Therefore, expression (1) is a condition which applies to any objective lenses.

It is desired that a larger radius direction, that is, the longer axis direction of an ellipse when elliptically polarized light is incident upon an objective lens is the track width direction on an optical recording medium. In a high-density recording medium, bad influences on the jitter characteristic can be suppressed by setting the beam spot radius in the track direction (in a direction perpendicular to the track width direction) as small as possible. The enlarged beam spot in the track width direction exerts bad influences on crosstalk and the like. However, it can be prevented by land/groove recording, crosstalk canceling or the like.

In the following, a specific structure of an optical pickup device will be described.

Figure 10:
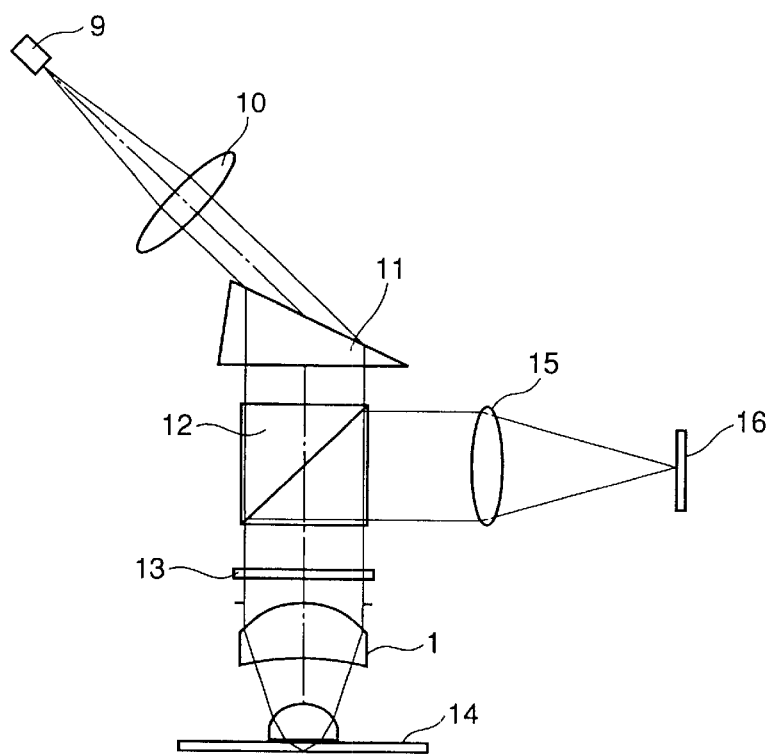
FIG. 10 shows a structure of an optical pickup device according to one embodiment of the present invention.
Figure 11:
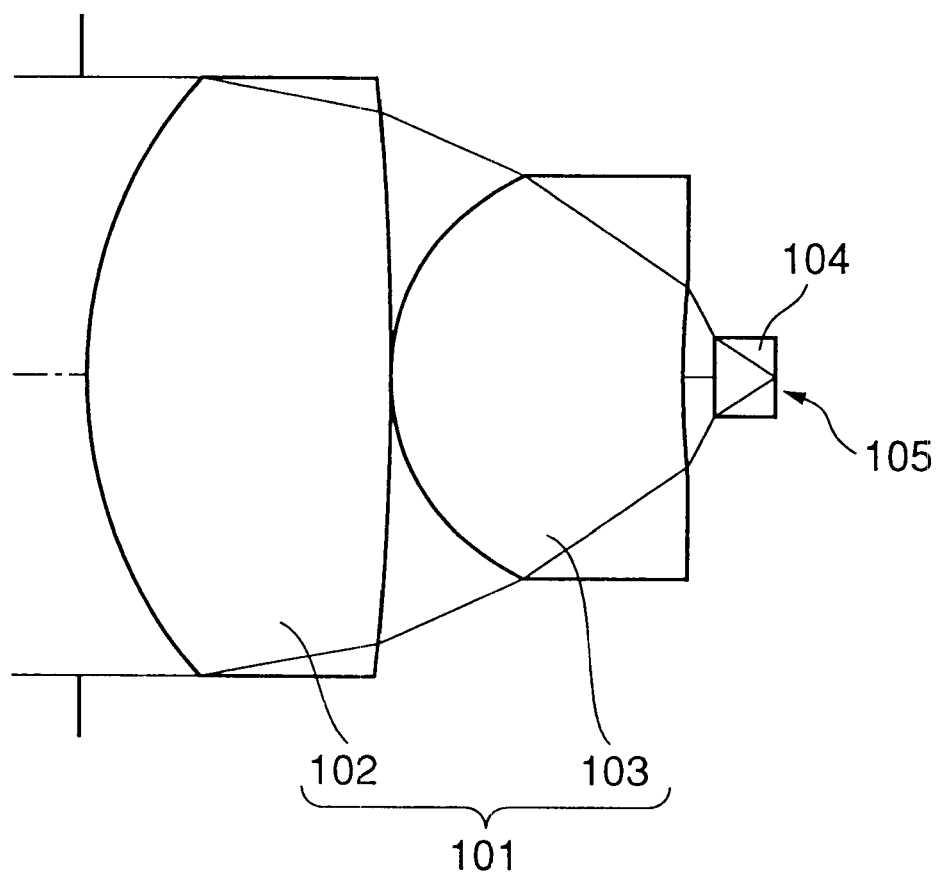
FIG. 11 shows a structure of a 2-group 2-element objective lens.

FIG. 10 shows a structure of an optical pickup device of the present invention. In the figure, an objective lens 1 has a similar structure to the one shown in FIG. 1.

A laser beam (linearly polarized light) having a wavelength of 635 nm which is emitted from an LD (laser diode) 9 as a light source is formed to a parallel light flux by a collimator lens 10, expanded and shaped in its light flux in the track width direction by a shaping prism 11, passed through a polarization beam splitter 12 and a ¼λ plate 13 before it is incident upon a first surface 4 of a first lens 2 of objective lens 1. The light flux which passes through objective lens 1 forms a beam spot on a signal recording plane of an optical recording medium 8. Light reflected on optical recording medium 8 traces back the above described route, reflects on polarization beam splitter 12, and detects an RF (Radio Frequency) signal, an RES (Radial Error Signal) and an FES (Focus Error Signal) at a light reception portion 16. Here, 15 denotes a convex lens.

The configuration of objective lens 1 used herein is as shown in Table 1 below.

TABLE 1

| surface number | radius of curvature (mm) | surface interval (mm) | refractive index of glass | Abbe constant of glass |
|---|---|---|---|---|
| STO | INFINITY | 0 | | |
| S1 | 2.29957 | 1.8 | nd = 1.4955 | vd = 81.6 |
| | K: −0.546649 | | | |
| | A: 0.677362E-03 B: −.533334E-05 C: −.531520E-04 | | | |
| | D: −.431210E-05 | | | |
| S2 | 9.13242 | 1.512127 | | |
| | K: −32.356495 | | | |
| | A: 0.250189E-02 B: 0.276494E-03 C: −.448344E-04 | | | |
| | D: −.127558E-03 E: 0.328618E-06 F: 0.243094E-04 | | | |
| | G: −.451777E-05 | | | |
| S3 | 1.11556 | 1.2 | nd = 1.58913 | vd = 61.3 |
| | K: −0.317089 | | | |
| | A: −.626846E-02 B: 0.627622E-02 C: 0.769126E-02 | | | |
| | D: −.150332E-01 | | | |
| S4 | INFINITY | 0.3 | | |
| S5 | INFINITY | 0.1 | nd = 1.51680 | vd = 64.2 |
| IMAGE | INFINITY | | | |
| focal length: 2.349 mm NA: 0.85 | | | | |

The NA of objective lens 1 used herein is 0.85 as indicated in the bottom row of Table 1, first lens 2 has two aspheric surfaces, and second lens 3 is a plano-convex lens having an aspheric shape for its convex surface. Here, the aspheric surface coefficients are represented by the following.

$$Z=(1/r)y^2/\{1+(1-(1+K)(1/r)^2y^2)^{1/2}\}+Ay^4+By^6+Cy^8+Dy^{10}+Ey^{12}+Fy^{14}+Gy^{16}$$

In the expression, Z is a distance in the optical axis direction between a point on the aspheric surface at a height of y from the optical axis and the aspheric surface apex, y is a height from the optical axis, r is a curvature radius at the aspheric surface apex, K is a conical constant, and A, B, C, D, E, F, G are aspheric surface coefficients.

Light which is incident upon objective lens 1 was elliptically polarized light and the ellipticity was 0.8 In the ellipse longer-axis direction, elliptically polarized light was formed in the track width direction on an optical recording medium. In the optical system, the beam spot which is formed on the optical recording medium was oval and the ovality (shorter axis/longer axis) was 0.97.

As described above, by designing and arranging an optical system including an objective lens to satisfy the above described condition of expression (1), the ovality of a beam spot which irradiates an optical recording medium can be made 0.9 or more, and the jitter characteristic and the like can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device for collecting a light beam from a light source by an objective lens and irradiating an optical recording medium, wherein said objective lens has a numerical aperture (NA) of 0.7 or more, and an ellipticity of polarized light of the light beam which is incident upon said objective lens is set to be larger than (1.4×NA)−0.7.

2. The optical pickup device according to claim 1, wherein the optical beam which is incident upon said objective lens is elliptically polarized light, and a longer axis direction of the ellipse is almost parallel to a track width direction of said optical recording medium.

3. The optical pickup device according to claim 1, wherein said objective lens includes two lenses which are arranged on an identical optical axis.

4. The optical pickup device according to claim 3, wherein said lenses include a first lens which has two aspheric surfaces and a second lens which is a plano-convex lens and has an aspheric shape for its convex lens.

5. The optical pickup device according to claim 2, wherein a ¼ wavelength plate is arranged on a light incident surface side of said objective lens to elliptically polarize light which is incident upon the objective lens.

* * * * *